United States Patent [19]

Gaylord, Jr. et al.

[11] Patent Number: 5,811,779
[45] Date of Patent: Sep. 22, 1998

[54] LASER BAR CODE READER SYSTEM FOR A FUEL ROD IN A BOILING WATER NUCLEAR REACTOR

[75] Inventors: William B. Gaylord, Jr.; James W. Reeves; Charles Hall, all of Wilmington, N.C.

[73] Assignee: General Electric Company, Schenectady, N.Y.

[21] Appl. No.: 686,500

[22] Filed: Aug. 22, 1996

[51] Int. Cl.⁶ .................................................. G06K 7/10
[52] U.S. Cl. .......................................... 235/462; 235/463
[58] Field of Search ...................... 235/462, 463

[56] References Cited

U.S. PATENT DOCUMENTS

| | | |
|---|---|---|
| 4,219,152 | 8/1980 | Couch et al. .................... 235/463 |
| 4,323,772 | 4/1982 | Serge ............................... 235/463 |
| 4,360,798 | 11/1982 | Swartz et al. .................... 235/463 |
| 4,587,407 | 5/1986 | Ahmed et al. . |
| 4,625,396 | 12/1986 | Ahmed et al. . |
| 4,636,846 | 1/1987 | Villarreal . |
| 4,680,457 | 7/1987 | Robertson ........................ 235/463 |
| 4,822,552 | 4/1989 | Ahmed et al. . |
| 4,822,987 | 4/1989 | Goldenfield et al. . |
| 4,857,260 | 8/1989 | Schoenig, Jr. et al. . |
| 4,894,848 | 1/1990 | Lambert et al. . |
| 4,960,984 | 10/1990 | Goldenfield et al. . |
| 4,963,719 | 10/1990 | Brooks et al. ................... 235/463 |
| 4,978,917 | 12/1990 | Goldenfield et al. . |
| 4,980,119 | 12/1990 | Shoenig, Jr. et al. . |
| 5,043,133 | 8/1991 | Lambert et al. . |
| 5,089,213 | 2/1992 | Omote et al. . |
| 5,098,642 | 3/1992 | Gaubatz . |
| 5,247,154 | 9/1993 | Ahmed . |
| 5,251,243 | 10/1993 | Nylund et al. . |
| 5,251,765 | 10/1993 | Patrick et al. . |

*Primary Examiner*—Harold Pitts
*Attorney, Agent, or Firm*—Nixon & Vanderhye PC

[57] ABSTRACT

A laser bar code is provided with a check sum that serves to validate the read accuracy with the action of reading itself. A bar code reader system includes a frame grabber in conjunction with video image processing software that utilizes the check sum to ensure accurate reading. The reader is used to check the accuracy and readability of the bar code mark and also for downstream bar bode reading.

11 Claims, 2 Drawing Sheets

5,811,779

LASER BAR CODE READER SYSTEM FOR A FUEL ROD IN A BOILING WATER NUCLEAR REACTOR

TECHNICAL FIELD

The present invention relates to a laser bar code reader system for reading a bar code on a fuel rod of a boiling water nuclear reactor and, more particularly, to a laser bar code reader system and method that enables rapid and accurate reader capability.

BACKGROUND

In a laser bar code marking process, the laser generally causes significant metal distortion (at a microscopic level) on the surface of the tube, which when exposed to reactor environments results in unacceptable degradation of fuel tubing. It is possible to reduce the darkness of the bar code to prevent such significant metal distortion, however, such reduction conventionally results in misreads and no reads of the bar codes. Moreover, reader systems used in previous devices do not support the rapid, accurate reader capability necessary for use with a low contrast or light bar code.

The ability to develop and use a light mark is dependent upon a reader system that can rapidly and reliably read the light mark with extreme accuracy. Conventional systems require a very dark mark that results in degradation of the fuel tubing. In addition, conventional systems do not use a check sum to improve the accuracy of the bar code reader.

There is thus a need to provide a laser bar code reader that can rapidly and reliably read a light mark with extreme accuracy.

DISCLOSURE OF THE INVENTION

It is an object of the invention to provide a laser bar code reader system and method for reading a bar code on a fuel rod of a boiling water nuclear reactor that overcomes the problems of conventional systems. It is another object of the invention to provide a bar code that includes a check sum to improve reader system accuracy. It is still another object of the invention to provide a reader system that is capable of accurately and reliably reading a lighter contrast mark.

These and other objects of the invention are achieved by providing a method of reading a bar code on a fuel rod for a boiling water nuclear reactor. The method includes (a) scanning a predetermined area to locate the fuel rod and the bar code; (b) outputting a signal representative of the fuel rod and the bar code; (c) determining a threshold level of the signal in accordance with maximum and minimum positive peaks and negative peaks, wherein peaks exceeding the threshold level correspond to a wide bar, and wherein peaks not exceeding the threshold level correspond to a narrow bar; (d) decoding a pattern of wide bars and narrow bars corresponding a character of the bar code in accordance with the threshold level; and (e) comparing the pattern to a stored set of binary patterns.

If the pattern does not match a binary pattern corresponding to a beginning character, the method may include repeatedly adjusting the threshold level and repeating steps (d) and (e) until the pattern matches the binary pattern corresponding to the beginning character. A read failure string may be returned if the threshold level is adjusted in the threshold level adjusting step to a value corresponding to a difference between the maximum and minimum peaks. If the pattern matches the binary pattern corresponding to the beginning character, steps (d) and (e) may be repeated until the pattern matches a second binary pattern corresponding to a terminating character. In addition, a read failure string may be returned if any of the patterns are not decoded or if an end of the signal has been reached. Similarly, a read failure string may be returned if an end of the signal has been reached without decoding the terminating character.

The method may further include repeating steps (d) and (e) until a character string with plural characters is decoded, and validating the character string. The validating step may comprise calculating a first check sum according to a designated plurality of characters, and comparing the first check sum with a second check sum appended to the character string. Scanning may include determining an area of interest (AOI) and selecting a unique test area from the AOI. Finally, the method may further include reducing a noise level of the signal.

In accordance with another aspect of the invention, there is provided a bar code reader for reading bar codes on a fuel rod of a boiling water nuclear reactor. The bar code reader includes a high resolution camera; a device for controlling the video camera to scan a predetermined area to locate the fuel rod and the bar code and for outputting a signal representative of the fuel rod and the bar code, wherein the controlling device determines a threshold level of the signal in accordance with maximum and minimum positive peaks and negative peaks, wherein peaks exceeding the threshold level correspond to a wide bar, and wherein peaks not exceeding the threshold level correspond to a narrow bar; a device for decoding a pattern of wide bars and narrow bars corresponding a character of the bar code in accordance with the threshold level; and a comparing device for comparing the pattern to a stored set of binary patterns.

BRIEF DESCRIPTION OF THE DRAWINGS

These and other aspects and advantages of the present invention will become apparent from the following detailed description of preferred embodiments when taken in conjunction with the accompanying drawings, in which.

BEST MODE FOR CARRYING OUT THE INVENTION

Figure 1:
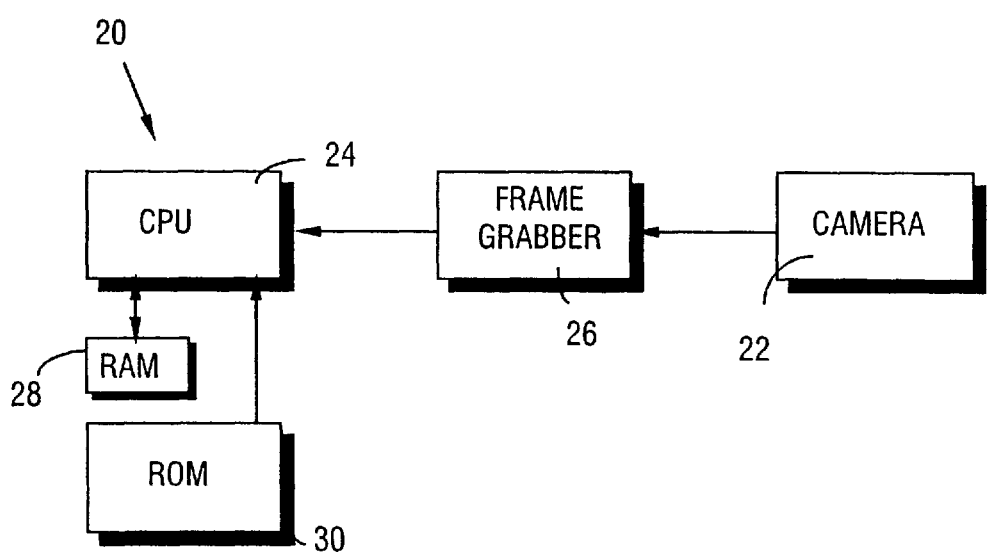
FIG. 1 is a block diagram of the reader system according to the invention.

FIG. 1 is a block diagram of the reader system 20 according to the invention. The reader system 20 includes a special purpose computer that is equipped with an RS-232 output, communicating with a high resolution video camera 22. The special purpose computer includes a CPU 24 that receives the images from the camera 22 through a known video frame grabber 26. A preferred frame grabber is the Scorpion Real Time VGA Frame Grabber available from Univision Technologies, Inc. of Burlington, Mass. The computer also includes a RAM 28 and a ROM 30 that includes video image processing software.

The unit remains stationary while a fuel rod or tube is passed horizontally into the TV camera field of view where an image is scanned and analyzed to decode the bar code. The camera used is preferably a standard video TV camera with an RS-170 output. The image is displayed on a video monitor for focusing and viewing of the process. The image is decoded and displayed on the monitor and sent to the computer RS-232 port for interfacing with other systems. Those of ordinary skill in the art may contemplate alternative structures for reading the bar codes from the fuel rods, and the invention is not meant to be limited to the system that is illustrated and described.

The system can be operated in two different modes of detection. In the manually triggered mode, a signal is sent either from the keyboard or from the RS-232 port to freeze and acquire an image for processing. This mode can be used if is known when the bar code will be in the TV field of view for processing. If the system fails to read a bar code in this mode, it will return a read failure message back to the monitor and the RS-232 port. In the automatic mode, the computer continuously scans the live image and reports whenever a new bar code is found. Each time a different bar code is found, it is sent to the monitor and RS-232 port. All duplicate findings of a bar code are ignored. This mode would be used to continuously monitor a moving rod through a process and report every occurrence of each individual bar code detected.

The bar code preferably is provided with a check sum that serves to validate the read accuracy within the action of reading itself. The check sum is determined by first evaluating the total of each of the first six characters of the bar code multiplied by a value based upon its position in the bar code. This product is truncated to the last two characters, and bar code characters representing this value are appended to the bar code. During the read process, the reader system reads the bar code and performs the same algorithm. The reader then reads the final two characters and determines if the check sum matches the right product. If the final characters do not agree with what the algorithm calculates, the read action is rejected and no data is passed. When the check sum is met, the read is accepted. The bar code utilized in this process is preferably a 3 of 9 configuration utilizing characters found in the base 34 bar code character set, 0–9 and a–z. Select characters such as *, i, o, "space," etc. were removed from the mark set to enhance the reliability of systems utilizing the bar code in manufacturing and to minimize errors associated with the bar codes.

Figure 2:
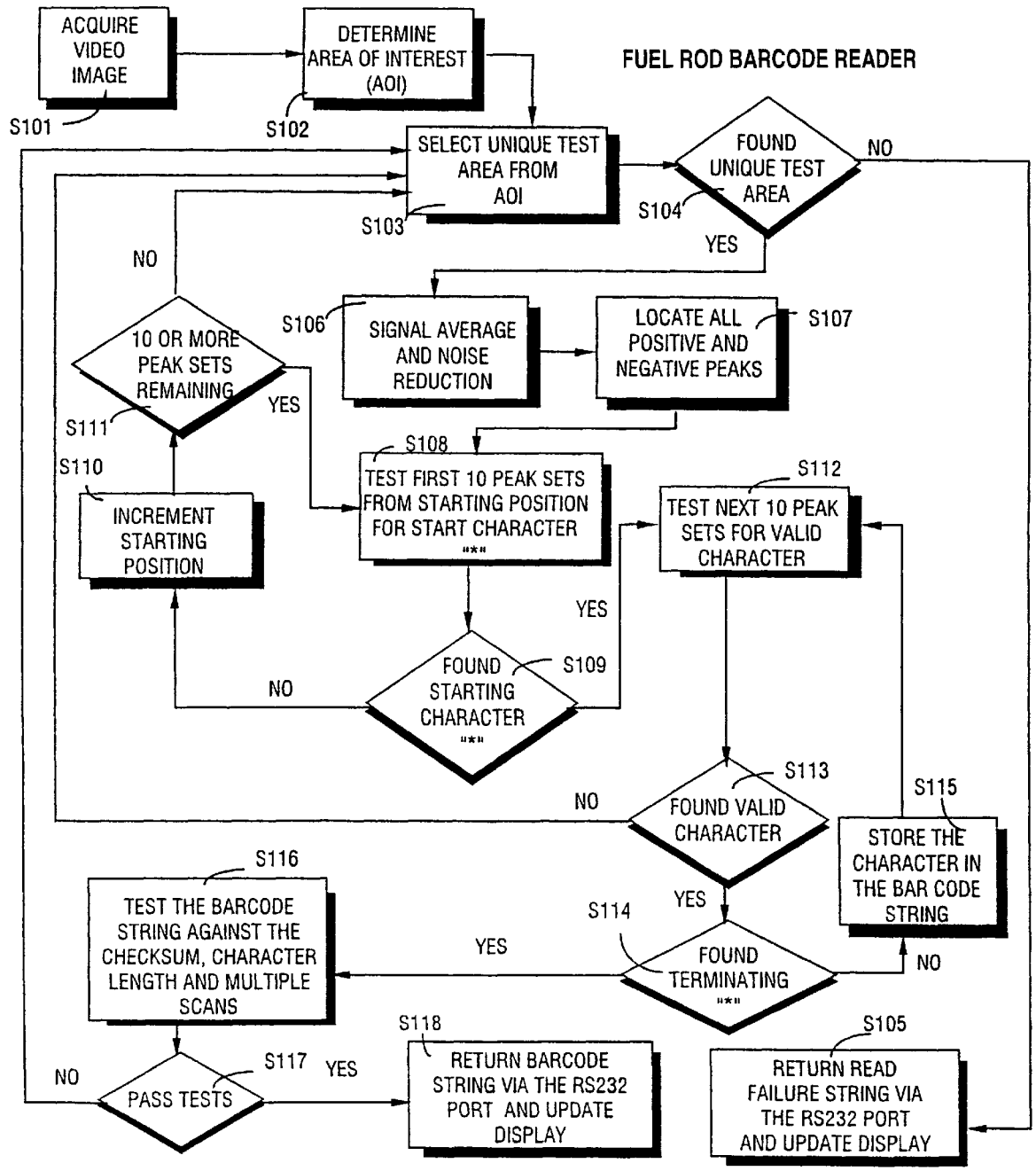
FIG. 2 is a flow diagram illustrating the process carried out by the CPU of the reader system according to invention.

FIG. 2 illustrates a flow diagram of the operations performed by the CPU in the reader process according to the invention. In step S101, the video image is acquired from the video camera and is digitized by the computer frame grabber into an eight bit gray scale image consisting of 480 rows with 640 pixels/row. An area of interest (AOI) is determined within the screen to process (step S102). This is accomplished by using one of two methods. The computer can scan for the rod location, or a predetermined section of the screen can be used. When scanning for the rod, a vertical line of pixels is obtained from the center of the screen. The line is scanned from both ends until a predetermined threshold value has been reached in each direction. The two points on the line that exceed the threshold represent the location of the top and bottom of the rod. If the threshold value is not reached, a location error is returned. The computer recognizes the threshold value because of the contrast change in the image of the fuel rod.

Once the AOI has been determined, a unique test area is selected from the AOI in step S103. This is accomplished by acquiring several horizontal rows of pixels from the beginning of the AOI, preferably three, and averaging the rows of pixels together to yield one representative scan line for the AOI. This array of pixels is recorded and passed to the decoding functions for determining the bar code.

In step S104, the CPU determines whether a unique test area has been found, i.e., one containing the bar code, and if not, the CPU moves to step S105 and returns a read failure string via the RS-232 port and updates the display. If a unique test area, including the bar code, has been located ("yes" in step S104), the noise level of the signal is reduced in step S106. This is accomplished using a moving average on the pixel array. The number of pixels averaged is directly dependent upon the bar code image size. For the fuel rod image size and the camera resolution in a preferred arrangement, this value is usually two or three depending on the zoom factor of the image. Once the noise level is reduced, the pixel array is searched for all positive and negative peaks, and their positions are recorded in a separate array (step S107). Each peak represents either a white bar (positive peak) or a black bar (negative peak). The leading edge of the bar code is determined by scanning through the peak array and looking for the first large change in intensity from light to dark. This is assumed to be the first black bar at the beginning of the bar code although other markings preceding the bar code could also be interpreted and likewise give rise to a false starting position. The first ten peak sets from the starting position are tested for a beginning character in step S108. The beginning character is, for example, "*". If the beginning character has not been found ("no" in step S109), the starting position is incremented (step S110), and it is determined whether there are ten peaks remaining (step S111). If so, the system moves to step S108, and the next ten peak sets are tested for the beginning character. If there are not ten peaks remaining ("no" in step S111), the system returns to step S103 to select another unique test area from the AOI.

In the present invention, the minimum and maximum of all positive and negative peaks are recorded for the representation of one character (ten positive and ten negative peaks) from the starting point of the bar code. An initial threshold value is calculated for the white bar as the positive maximum minus, for example, 10% of the difference between the positive maximum and minimum. Likewise, the black bar threshold is determined as the negative minimum plus, for example, 10% of the difference between the negative maximum and minimum. All peaks are compared to the threshold, and a binary pattern is constructed. All positive peak intensities greater than the threshold are recorded as being a wide white bar (00), while all peaks less than the threshold are recorded as being a narrow white bar (0). Similarly, all negative peak intensities less than the threshold are recorded as being a wide black bar (11), and all negative peak intensities greater than the threshold are recorded as being a narrow black bar (1).

Once a pattern has been recorded for the required number of bars to construct a character, the pattern is compared to a stored set of binary patterns that represent the code 39 patterns. If the pattern does not match the pattern stored for the particular beginning character, for example, "*", the threshold value is adjusted and the process for determining the pattern is started over. This process continues until either a pattern match occurs or the threshold value is adjusted to 100% of the delta of either the positive or negative peak intensities. If a pattern match does not occur, an error is returned, and the starting position of the bar code in the peak array is incremented to the next negative peak and the pattern recognition process is started over. The process for constructing the pattern is repeated until either the beginning character ("*") is decoded or the end of the peak array has been reached. If the end of the peak array is reached without decoding the beginning character, a read failure is returned for this AOI. If the beginning character is successfully decoded, the next set of peaks in the array are processed to determine all other characters in the bar code (step S112).

This process continues until a terminating character, for example, another "*", is decoded or the end of the peak array has been reached. If any of the character patterns are not decoded or the end of the array is reached without decoding the terminating character, a read failure is returned for this AOI.

Once the character string has been decoded, it must pass several tests (steps S116 and S117) to be considered a valid read. Initially, the check sum (described above) is checked and must match when decoded. Other checks include checking for a known number of characters in the bar code and requiring multiple sequential reads to match before recording a successful read.

If the bar code is not decoded for any reason, the image is rescanned and another area of the AOI is used for the decoding process. This process continues until either a successful read is accomplished or all sections of the AOI have been exhausted. The final return from the sequence is either the decoded bar code in step S118 or a read failure in step S105.

The bar code number is assigned by the CPU in accordance with a central database information system. The central database information system monitors and manages the manufacturing process. The bar code is used to mark the tube, to provide a trace for process and quality data to a specific tube, and to support the central database information system.

The reader system 20 according to the invention is usable in the marking process to confirm proper and readable bar code marking of the fuel tube and also for downstream reading of the bar code. In the marking process, after a first bar code is marked. The reader system 20 reads to confirm the bar code, preferably using the check sum, a tube feeder rotates the fuel tube, the marking system marks the fuel tube a second time, the reader system 20 reads and confirms the mark, the tube feeder rotates the fuel tube a final time, the marking system marks the bar code a final time, the reader system 20 reads and confirms the bar code a third and final time, and the tube is extracted.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

What is claimed is:

1. A method of reading a bar code on a fuel rod for a boiling water nuclear reactor, the method comprising:

(a) scanning a predetermined area to locate the fuel rod and the bar code;

(b) outputting a signal representative of the fuel rod and the bar code;

(c) determining a threshold level of the signal in accordance with maximum and minimum positive peaks and negative peaks, wherein peaks exceeding the threshold level correspond to a wide bar, and wherein peaks not exceeding the threshold level correspond to a narrow bar;

(d) decoding a pattern of wide bars and narrow bars corresponding a character of the bar code in accordance with the threshold level; and (e) comparing the pattern to a stored set of binary patterns.

2. A method according to claim 1, wherein if the pattern does not match a binary pattern corresponding to a beginning character, the method further comprises repeatedly adjusting the threshold level and repeating steps (d) and (e) until the pattern matches the binary pattern corresponding to the beginning character.

3. A method according to claim 2, wherein if the threshold level is adjusted in the threshold level adjusting step to a value corresponding to a difference between the maximum and minimum peaks, the method comprises returning a read failure string.

4. A method according to claim 2, wherein if the pattern matches the binary pattern corresponding to the beginning character, the method comprises repeating steps (d) and (e) until the pattern matches a second binary pattern corresponding to a terminating character.

5. A method according to claim 4, wherein if any of the patterns are not decoded or if an end of the signal has been reached, the method comprises returning a read failure string.

6. A method according to claim 4, wherein if an end of the signal has been reached without decoding the terminating character, the method comprises returning a read failure string.

7. A method according to claim 1, further comprising repeating steps (d) and (e) until a character string with plural characters is decoded, the method further comprising validating the character string.

8. A method according to claim 7, wherein the validating step comprises calculating a first check sum according to a designated plurality of characters, and comparing the first check sum with a second check sum appended to the character string.

9. A method according to claim 1, wherein said scanning step comprises determining an area of interest (AOI) and selecting a unique test area from the AOI.

10. A method according to claim 1, wherein, prior to step (d), the method further comprises reducing a noise level of the signal.

11. A bar code reader for reading bar codes on a fuel rod of a boiling water nuclear reactor, the bar code reader comprising:

a high resolution camera;

means for controlling said video camera to scan a predetermined area to locate the fuel rod and the bar code and for outputting a signal representative of the fuel rod and the bar code, said controlling means determining a threshold level of the signal in accordance with maximum and minimum positive peaks and negative peaks, wherein peaks exceeding the threshold level correspond to a wide bar, and wherein peaks not exceeding the threshold level correspond to a narrow bar;

means for decoding a pattern of wide bars and narrow bars corresponding to a character of the bar code in accordance with the threshold level; and means for comparing the pattern to a stored set of binary patterns.

* * * * *